United States Patent
Carr

[11] 3,908,302
[45] Sept. 30, 1975

[54] ROACH TRAP

[75] Inventor: Richard V. Carr, Naperville, Ill.

[73] Assignee: Velsicol Chemical Corporation, Chicago, Ill.

[22] Filed: May 28, 1974

[21] Appl. No.: 474,117

[52] U.S. Cl. ................................................. 43/121
[51] Int. Cl.² ........................................ A01M 1/10
[58] Field of Search ............. 43/107, 121, 123, 108, 43/109, 119, 132, 133, 134

[56] References Cited
UNITED STATES PATENTS

| | | | |
|---|---|---|---|
| 812,761 | 2/1906 | Meier | 43/121 |
| 914,571 | 3/1909 | Heath et al. | 43/121 |
| 1,209,993 | 12/1916 | Oettinger | 43/121 |
| 1,277,354 | 9/1918 | Arabian | 43/121 |
| 1,999,342 | 4/1935 | Reynolds | 43/121 |
| 2,000,193 | 5/1935 | Schroder | 43/121 |
| 3,581,429 | 6/1971 | Hickman | 43/107 |
| 3,851,417 | 12/1974 | Wunsche | 43/121 |

*Primary Examiner*—Louis G. Mancene
*Assistant Examiner*—J. Q. Lever
*Attorney, Agent, or Firm*—Robert J. Schwarz; Dietmar H. Olesch

[57] ABSTRACT

This invention discloses a roach trap having two pyramid-shaped entranceways and having openings which attract the German as well as the American cockroach.

3 Claims, 5 Drawing Figures

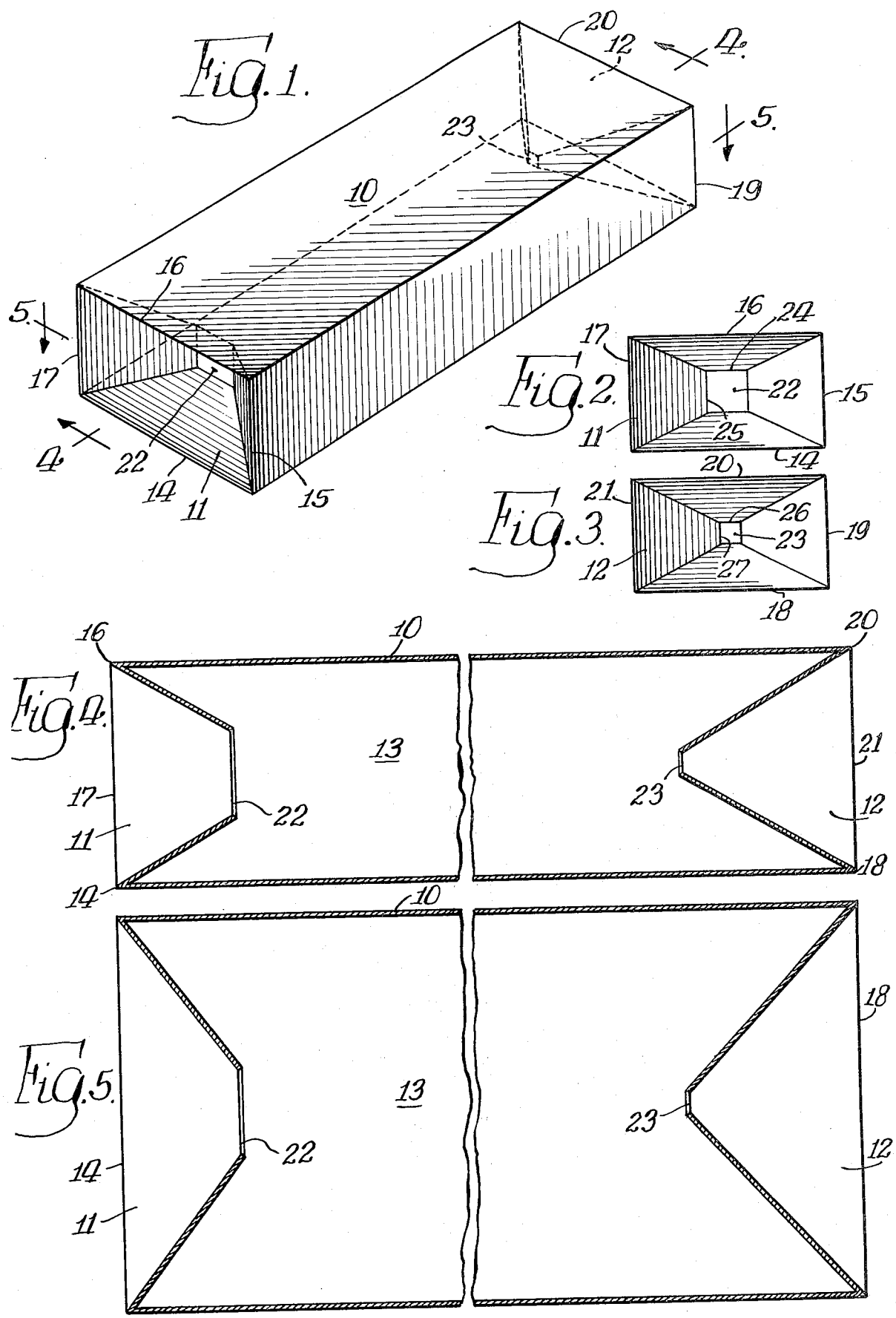

ROACH TRAP

This invention relates to an insect trap and more specifically relates to a boxlike housing capable of attracting and trapping both the American and German cockroach.

Roaches have always been a household pest and numerous devices for trapping and/or poisoning them have been devised. In spite of the continuing effort to control roaches in dwellings as well as commercial buildings, unsatisfactory progress has been made. There are several reasons why an adequate control of roaches, particularly in households, has not been successful. First, roaches are primarily nocturnal insects which stay hidden in small cracks and crevices during the day. Further, they are extremely fast runners making them difficult to catch.

Recently a variety of pesticides have been discovered which are capable of killing roaches by poisoning. Such pesticides are applied by spraying liquid formulations of the toxicant in and around the areas infested with roaches. Some reluctance, however, to use these chemicals in kitchens, pantries or other areas where food is stored exists. Thus there is a need for a simple and effective means of controlling roaches.

It has now been found that a rectangular box-shaped housing having entranceways of a particular configuration are unexpectedly effective in both attracting and trapping both the American as well as the German cockroach. More specifically it has been found that a housing having pyramid-shaped entrance-ways with specific sized openings makes an excellent roach trap.

Thus one embodiment of the present invention resides in a roach trap comprising an elongated rectangular prismatic housing having a truncated pyramid-shaped entrance-way at each end of the housing extending toward the interior of said housing, the outer edge of each of said entrance-ways being substantially congruent with the periphery of the ends of said housing, the first of said entrance-ways having a rectangular opening at its vortex, the sides of which have a dimension of from about three-fourths to about seven-eighths inch, and the second of said entrance-ways having a rectangular opening at its vortex, the sides of which have a dimension of from about three-sixteenths to about three-eighths inch.

The dimensions of the openings through which a roach enters the housing have been found to be important. A cockroach more readily enters an opening the size of which is similar to the transverse section of his torso. Thus, an American cockroach is most likely to enter an opening which is about three-fourth to seven-eighth inches across whereas a German cockroach is most likely to pass through an opening about three-sixteenths to three-eights inch across.

Accordingly, the roach trap of the present invention is equipped with two openings the dimensions of one of which accommodates the American cockroach and the dimensions of the other accommodates the German roach.

The roach trap of this invention has a pyramid-shaped entrance-way which provides a ramp to the opening which can be readily traversed by a roach. Moreover the pyramid-shaped entrance-way provides such a ramp regardless of the position of the roach trap. The geometry of the pyramid-shaped entrance-way prevents a roach from escaping from the trap once he has entered. It has been found that the anatomy of a roach is such that he is not able to navigate the 180° turn over the edge of the opening in the entranceway.

A more specific embodiment of the roach trap of the present invention is illustrated in the accompanying drawing wherein various aspects of the trap are shown in five figures.

FIG. 1 shows the roach trap in a three dimensional perspective.

FIG. 2 is a front view of the roach trap showing the entrance-way at one end of the trap.

FIG. 3 is a back view of the roach trap with details of the second entrance-way.

FIG. 4 is a vertical cross-section taken along plane 4—4 in FIG. 1 exposing the interior of the trap.

FIG. 5 is a horizontal cross-section taken along plane 5—5 in FIG. 1.

Referring now specifically to the drawings in FIG. 1, there is shown in perspective a roach trap consisting of an elongated rectangular prismatic housing 10. The housing 10 has truncated pyramid-shaped entrance-ways 11 and 12 at each end. Each pyramid-shaped entrance-way 11 and 12 has a rectangular opening 22 and 23 at its vortex. The larger opening 22 has dimensions equivalent to or slightly larger than a vertical cross-section of the torso of an American cockroach. Similarly, the smaller opening 23 has general dimensions of the cross-section of a German cockroach. It can be seen that the outer edge 14, 15, 16 and 17 of the entrance-way 11 is congruent with the periphery of the end of housing 10.

FIGS. 2 and 3 show in greater detail entrance-ways 11 and 12 respectively. In each instance the pyramid-shaped entrance-ways 11 and 12 lead to centrally located openings 22 and 23. Thus, regardless of the positioning of the housing 10 a cockroach can walk across the particular leading edge 14, 15, 16 or 17 and 18, 19, 20 or 21 which happens to be in contact with a floor, a wall or other surface on which the cockroach may walk.

FIGS. 4 and 5 are showing the cross-section of the housing 10 exposing the interior of the housing 13. Further shown are the entranceways 11 and 12 leading to the openings 22 and 23 into the interior 13.

The roach trap of this invention can optionally be equipped with a door in communication with its interior to facilitate the removal of dead roaches. This door can be placed in the walls of the housing and should be equipped with means to secure it so as to prevent the escape of any roaches. Furthermore, the trap can, if desired, be equipped with a window in the walls of the housing so as to enable visual inspection of the number of roaches trapped. If the trap is equipped with such a window it is preferred that there be provided some means of obscuring the window in order to maintain relative darkness within the roach trap. Maintaining the interior of the trap dark renders it more effective in attracting roaches since roaches prefer dark spaces.

The roach trap of the present invention can be used in conjunction with poisonous baits. Such baits can be conveniently placed inside the trap where they are safely out of the reach of pets and children and will not find their way into food supplies. Roach baits are known in the art and can be purchased as articles of commerce.

The roach trap of this invention can be constructed of any suitable material such as cardboard, plastic or sheet metal. Since, as mentioned, a dark interior is preferred in the trap the material used in its construction should be opaque.

It is readily apparent that while a specific embodiment of the present invention has been described in the specification and drawing, changes and modifications can be made therein without departing from the scope of the invention as defined in the appended claims.

I claim:

1. A roach trap comprising an elongated rectangular prismatic housing, having a truncated pyramid-shaped entrance-way at each end of the housing extending toward the interior of said housing, the outer edge of each of said entrance-ways being substantially congruent with the periphery of the ends of said housing, the first of said entrance-ways having a rectangular opening at its vortex, the sides of which have a dimension of from about three-fourths to about seven-eighths inch, and the second of said entrance-ways having a rectangular opening at its vortex, the sides of which have a dimension of from about three-sixteenths to about three-eights inch.

2. The roach trap of claim 1, wherein it is equipped with a door in communication with the interior of the housing.

3. The roach trap of claim 1, wherein it is equipped with a window.

* * * * *